Aug. 15, 1933.  J. F CAVANAGH  1,922,471
APPARATUS FOR MANUFACTURING RUBBER TIRE TUBES
Filed Oct. 15, 1930  2 Sheets-Sheet 2
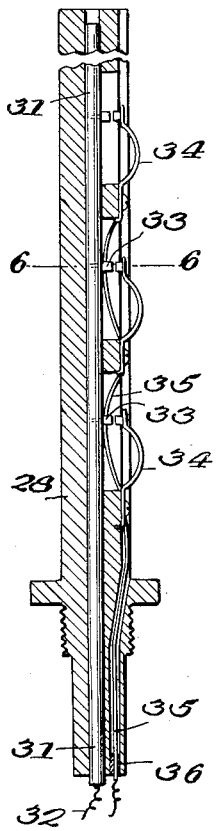
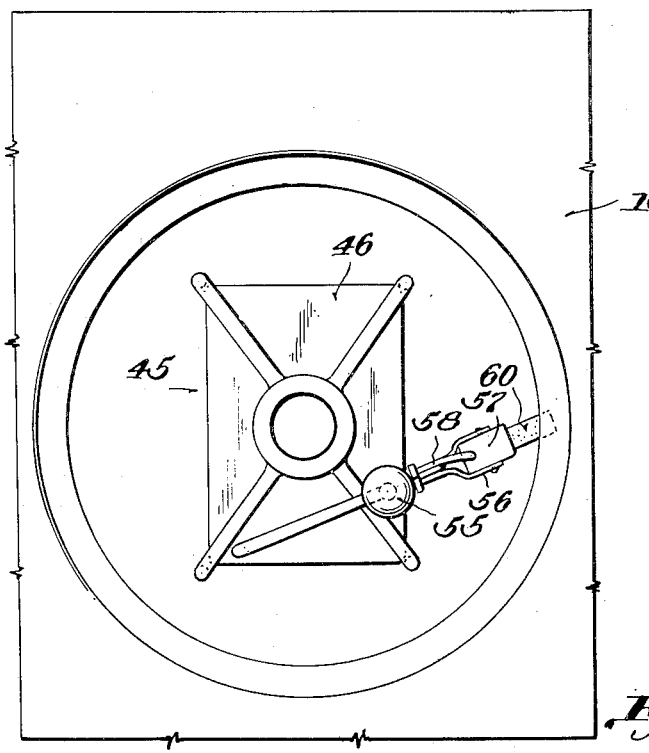
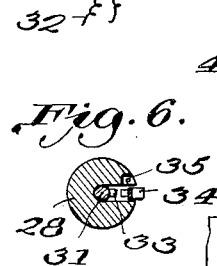
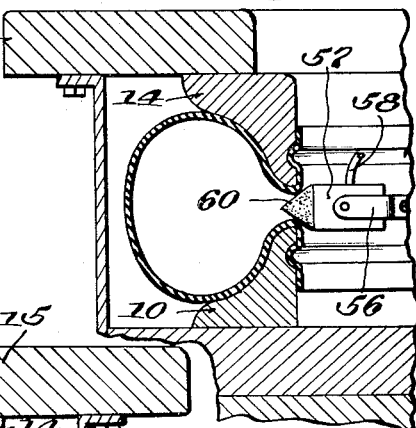

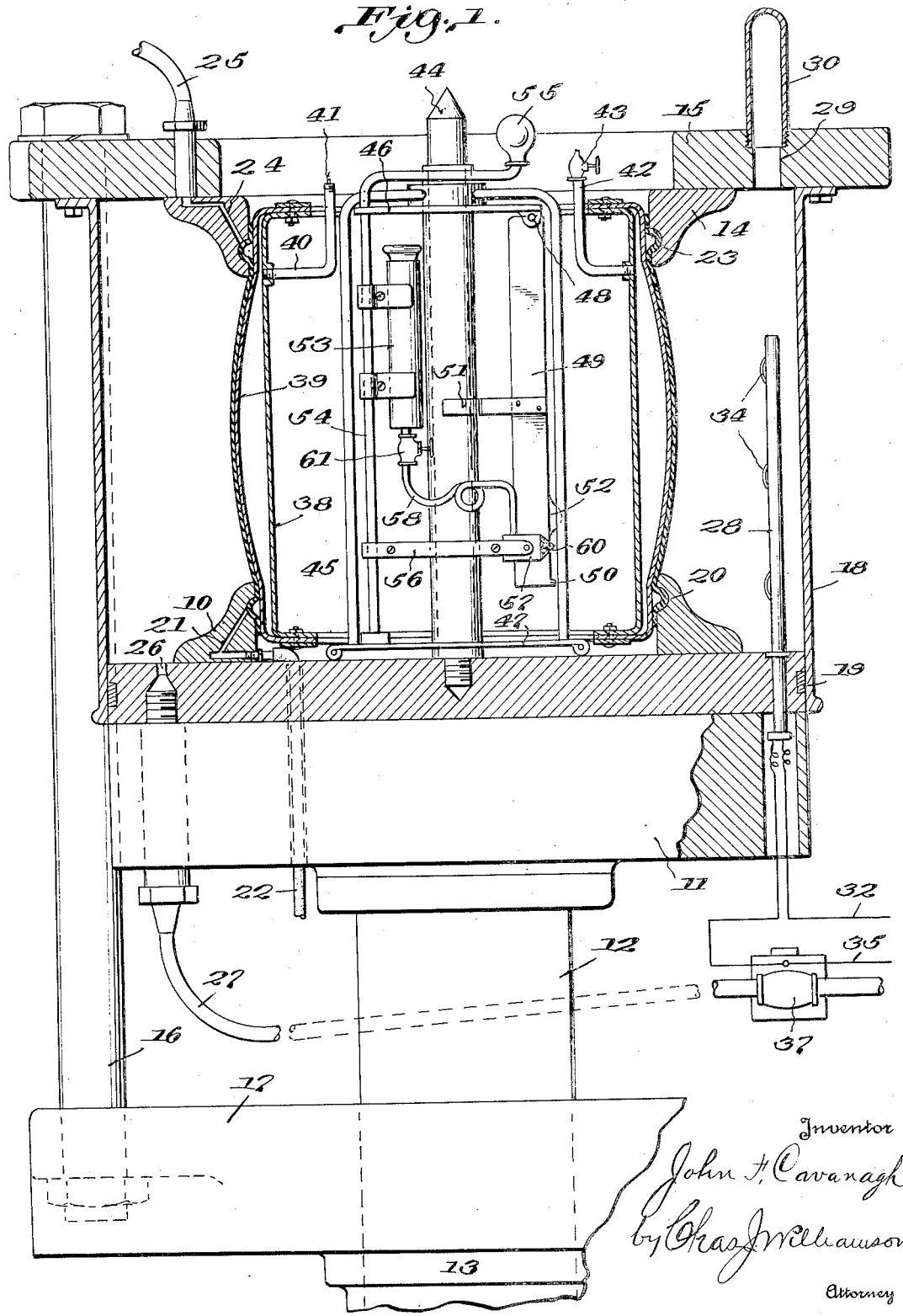

Patented Aug. 15, 1933

1,922,471

UNITED STATES PATENT OFFICE 1,922,471

APPARATUS FOR MANUFACTURING RUBBER TIRE TUBES

John F. Cavanagh, Pawtucket, R. I., assignor to William Wallace Potter, Pawtucket, R. I.

Application October 15, 1930. Serial No. 488,932

6 Claims. (Cl. 154—9)

It has been proposed to manufacture inner tubes for pneumatic tires by providing an annular chamber with a wall which in cross-section is substantially elliptical, but open on its inner periphery, so that it is substantially U-shape and forcing a "pulley" or annular band placed across the open inner periphery into that chamber by suction from within a vacuum box. To accomplish that, the band (which, of course, is of rubber) must be stretched as it is forced into the U-shape chamber in order to make it conform to the bellied, laterally and outwardly curving concave interior of the chamber, so that stretching of the rubber sheet or band must take place laterally or parallel with the axis of the annular chamber as well as radially outward. There are limitations to the stretchability of the rubber band or blank which greatly limit if indeed they do not render impractical the production of a rubber inner tube for tires. By my invention, it will be found that while I start with a "pulley" or a flat rimmed annular band of rubber and cause the band to stretch radially outward to produce the outer periphery of the finished tube, I do not stretch the rubber laterally to make it conform or adapt itself to the wall of any U-shape chamber, but as the radial stretching takes place, the opposite sides or edges of the annular band, as outward radial bulging takes place are made to approach either by movement of both edges simultaneously or of one edge towards the other so that by the mere drawing towards one another of those portions of the band (which constitute the side walls of the completed inner tube) towards the inner periphery of the tube, the substantially elliptical form of the inner tube in cross-section is produced and without any necessity for stretching the rubber.

One object of my invention is to control automatically the vacuum which causes the production of the tube from a "pulley". Another object of my invention is the mechanical supply of material, usually powdered talc to the interior of the tube being formed to prevent adhesion of the walls when the tube is deflated; and to supply mechanically, or automatically, the usual solvent to the seam forming edges. Heretofore these two operations have been done by hand, the talc being introduced with the aid of a spoon and the solvent being applied with a piece of absorbent material saturated with solvent.

It has been difficult to introduce the talc without risk of depositing some on the seam edge where it is very objectionable, while the application of solvent was slow and tedious with uniform application difficult.

My invention consists in whatever is described by or is included within the terms or scope of the appended claims.

In the drawings:—

Fig. 1 is a view partly in side elevation and partly in section of a machine constituting one desirable embodiment of my invention, the parts of the machine being shown in full lines in the relative position they occupy when the rubber pulley or flat-sided annular band is ready for the forming operations;

Fig. 2 is a top plan view;

Fig. 3 is a detail view partly in section showing the talc supplying device in operating position;

Fig. 4 is a like view of the solvent applying device;

Fig. 5 is a detail view in section of an electrical device for controlling the degree of bulge or radial expansion of the tube being formed;

Fig. 6 is a cross section on the line 6—6 of Fig. 5;

The embodiment of my invention shown in the drawings employs two opposite and concentric rings each mounted on a bed or platen which by a hydraulic press are movable to change the distance between them along the line of their axes and which when farthest apart are overlapped on their inner peripheries by the opposite edge portions of the rubber or elastic band to which inner peripheries such edge portions are secured or held pneumatically during the operation of stretching the band radially outward pneumatically (as by a vacuum on the outer side of the band) and simultaneously causing the edge portions of the band to approach and to be brought together and finally joined in a seam on the inner periphery of the then finished inner tube, this seaming or joining being accomplished by the pressure from the opposing edges of the two supporting rings, upon the interposed rubber. The outward bulging of the elastic blank takes place without the exterior thereof coming into contact with any external supporting surface, such a surface being unnecessary because there is no lateral stretching or expansion outward of the walls of the tube being formed, but on the contrary the walls in a lateral direction are simply moved towards one another and without any stretching of the material and incidental to the action of the two rings in being made to approach one another for the purpose finally of sealing or seaming together the edges at the inner periphery of the finished tube. In effect, the walls are closed or brought together and joined at the inner periphery about an annular core or body of air.

The press shown in the drawings is arranged in a vertical position so that one blank edge supporting ring is above the other and the tube formed lies horizontally, its axis being vertical, but, of course, such a position is not indispensible.

Describing in detail what is shown in Fig. 1, the lower band edge engaging ring, 10, is secured to the upper side of a movable bed or platen, 11, which is mounted on the top of the ram, 12, of a conventional hydraulic cylinder, 13. The upper band edge supporting ring, 14, is secured to the under side of a stationarily supported bed, 15, said bed, 15, being solidly supported by a suitable number of columns or posts, 16, bolted at the bottom ends to the bed, 17, of the press which is placed upon the floor and below which the hydraulic cylinder extends.

Concentric with the rings, 13 and 14, and enclosing but spaced apart from them is a shell or cylinder, 18, which extends from its top downward from the bed, 15, and with whose interior wall the platen, 11, makes an air-tight fit as by means of a suitable packing, 19. Thus a box or chamber of ring form is provided so that when the upper and lower edge portions of the band that forms the blank from which the tube is to be made are secured air-tight against the inner peripheries of the rings, 13 and 14, and such blank reaching across from one ring to the other closes the space between them, the air may be exhausted from within the shell, 18, with the result that the band or blank will be bellied laterally outward into the hermetically sealed space within the shell, 18.

The lower ring, 10, has on its inner periphery an annular groove, 20, over which lies one edge portion of the blank or band from which leads an air hole or passage, 21, through the ring which by suitable hose or piping, 22, is connected with a vacuum pump. Thus a partial vacuum may be produced on the outer side of the rubber band overlying the annular groove, 20, and thereby that edge portion of the band is securely held and with an air-tight seal to the lower ring, 10. The upper ring, 14, has on its inner periphery an annular groove 23, from which leads an air hole or passage, 24, which by suitable pipe or hose, 25, is connected with the vacuum pump so that the edge portion of the band applied to the inner periphery of the ring 14 may in like manner be pneumatically secured to the ring.

The vacuum pump is also connected by an air hole, 26, opening through the platen, 11, and the vacuum box within the shell, 18, from which air hole a suitable pipe or hose connection, 27, is made with the pump.

From what has been before said, it will be seen that the radial stretching or extension outward in the formation of the tube takes place concurrently with the movement towards one another and together of the opposite side walls of the tube being formed. This action makes it desirable to control the vacuum which causes such radially outward extension so that there is such relation between the two actions taking place simultaneously that the side walls of the tube being formed shall properly be rounded out and such proper rounding out completed just as the rings 13 and 14 come together to seam the edges of the tube at the inner periphery thereof and to pinch off the excess material which consists of the amount of lap of the band edges on the inner peripheries of the rings. Accordingly an automatic vacuum control is provided. This may conveniently be electrical. It comprises a normally open circuit which includes a magnet or solenoid operated valve in the vacuum pipe line and a switch which is closed by contact of the exterior of the tube being formed when its outer periphery has been stretched or extended to the desired degree.

As shown in the drawings the switch includes a tubular post 28, of insulating material secured at its lower end by a threaded air-tight connection in a hole in the platen, 11, and which extends vertically through the vacuum box and as it partakes with the movement of the platen, a hole 29, is provided through the upper ring-supporting bed, 15, which is closed at the top by a vertically elongated air-tight cover, 30, so that vertical movement of the post with the platen may take place without impairing the vacuum. Within a vertical passage through the post, 28, and extending from top to bottom thereof is a rod, 31, of conducting material which at its lower end by a wire, 32, is connected to the line for supplying current. At intervals the rod, 31, has contacts, 33, spaced apart vertically for each of which is an outwardly bowed contact spring, 34, which normally breaks the contact but which when pressed outward by contact of the outwardly bellying tube-forming band closes the circuit and operates the valve to break the vacuum. The contact springs, 34 are connected by a common wire, 35, which passing through a hermetically sealed hole, 36, in the post, 28, goes to the magnet or solenoid of the valve, 37, and thence to the outside line.

It will be seen that if after the vacuum has been broken by the closing of the circuit from the outward pressure of the tube being formed and before the complete joining and sealing of the edges at the inner periphery of the tube, inward contraction of the tube walls should take place as from leakage in the air pipe lines, the breaking of the circuit which would result by release of pressure on the spring contacts would instantly operate the vacuum breaking valve and result in the bulging of the tube to the desired extent.

The band which forms the blank from which the inner tube is to be made is, of course, inherently flimsy and lacking in enough rigidity to be self-supporting. It is necessary, therefore, to provide means that constitute a temporary support for placing it in the press and with its opposite edges in contact with the inner peripheries of the rings 10 and 14. Such means comprise a cylindrical drum, 38, having a peripheral cover or envelope, 39, preferably of rubber secured at opposite ends to the drum heads in an air-tight manner so that by the introduction of air pressure on the inner side of the cover or envelope, it will bulge or expand convexly outward and have a corresponding action or effect upon the annular band or blank from which the tube is to be made that is placed over the drum in a loose or relaxed state. The blank will thus be supported and by placing the drum through a central opening in the supporting bed of the upper ring, 14, and so that the upper and lower edges of the blank are opposite the inner peripheries of the respective rings 10 and 14, the band may be placed in position for the action of the press. When placed in such position, the band edges are in contact with the inner peripheries of said rings and upon the production of the vacuum between the band edges and the rings, such edges will be tightly held in contact with the ring surfaces and the band bellied slightly outwards will extend across between the two now widely separated rings. The positioning and securing of the band or blank being thus accomplished, the air pressure is removed from the interior of the envelope and thereby the drum is released from the band or blank and is removed from the press so that the ensuing operations of producing the vacuum within the vacuum box and causing the approach of one ring to the other may be carried on.

For inflating or expanding the flexible drum envelope, a pipe 40, extends at one end through the drum periphery and at the other end is carried through one of the heads of the drum and is provided thereat with a check valve, 41, such as the ordinary tire inflating valve with which an air hose connection can be made to supply air under pressure. To take the pressure from within the envelope, a pipe, 42, at one end opens through the drum periphery and at its other end emerges through the drum head where it is provided with a valve, 43, which is opened to take off the air pressure.

At the center of the lower platen is a vertical pintle, 44, upon which is rotatably mounted a cage or framework, 45, of vertical bars and horizontal head plates, 46, and 47 at top and bottom respectively. Suspended from upper head plate, 46 by a suitable hinge, 48, is powder box, 49, provided with a lateral discharge orifice, 50, at its lower end. Said box is provided with a spring clip, 51, for clasping and frictionally engaging pintle, 44, and thus holding said box in its normally back or non-discharge position. A bumper, 52, made preferably of wood or rubber is fixed upon the side of said box near its lower end, just above orifice, 50, so as to strike against the inner side of the upper mold 14, when swung to the position shown in Fig. 3 with enough violence to discharge powder from the orifice or nozzle, 50, into the tire tube, into which said nozzle is at the time inserted through the nearly closed seam-forming edges.

For the supply of solvent to the seam edges, just before they are closed, a solvent can or container, 53, is secured to a vertical shaft, 54, supported by and journalled in the head plates eccentric to the pintle, 44, which shaft has a crank handle, 55.

Below the can, a radial arm, 56, projects from the shaft which at its free end supports a small solvent receptacle, 57 into which leads a tube, 58, from the can, and which has its outer end closed by a piece 60, of felt, or other absorbent material which the solvent saturates. The tube, 58, has a valve, 61, to adjustably restrict the flow of solvent to the felt.

After the band or "pulley" has been placed in the press and the tube is completed up to the point of closing the seam, the powder box is swung outward until the bumper strikes the mold as shown in Fig. 3, when a small amount of powder is jolted into the inside of the tube. The box is then swung back to its normal position where it is retained by the clip, 51.

Crank handle, 55, is then swung outward until the felt, 19, contacts with both seam edges as shown in Fig. 4. Further movement of the handle results in a rotary movement of the cage, 45, which imparts in turn a rotary motion to the felt tip, 60, while it is in contact with the seam edges and thus the solvent is applied to the entire seam circle. The handle 55 is then swung in to its normal retracted position shown in Fig. 1.

The band transfer drum, 38, is made with heads having holes suitable for sliding over cage, 45, which in this instance are rectangular because of that contour of the cage.

By my invention powder and solvent can be applied without waste, more rapidly than by hand, and with safety to the workman.

What I claim is:—

1. Tire making apparatus comprising a vacuum chamber, means to support a flexible blank with a portion extending across such chamber and free to belly into the same, under air pressure, and automatic means to stop such action including a device touched by said blank when bellied to a certain extent.

2. Tire making apparatus comprising a vacuum chamber, means to support a flexible blank with a portion extending across such chamber and free to belly into the same, under air pressure, and automatic means to stop such action including a circuit controlling device touched by said blank when bellied to a certain extent.

3. In mechanism for forming hollow articles of rubber, the combination of a seam closing device comprising opposing relatively movable article-edge engaging members, a source of supply of substance for application to the rubber before the seam is closed and means to move said source of supply towards and from the seam forming edges.

4. In mechanism for applying solvent to seam edges a seam forming device, a support pivoted at the center of said seam forming device, an absorbent member carried by said support, and means for rotating said support while said absorbent member is in contact with the seam edges in said seam forming device.

5. In tube making mechanism a circular device for forming a tube by bringing the opposite edges of a band into seam relationship, and a movably supported container of substance for injection into said tube, having a discharge orifice, said container orifice being movable into and out of opposition to a space between said seam edges.

6. A mechanism as in claim 3 in which the source of supply of the substance is bodily movable relative to the members of the seam closing device and has a portion that is thrust between the article-edge engaging portions of the members thereof.

JOHN F. CAVANAGH.